No. 739,155. PATENTED SEPT. 15, 1903.
C. R. CULVER.
TRACKWAY FOR BICYCLE RIDERS OR OTHER PERFORMERS.
APPLICATION FILED JAN. 3, 1903.
NO MODEL.
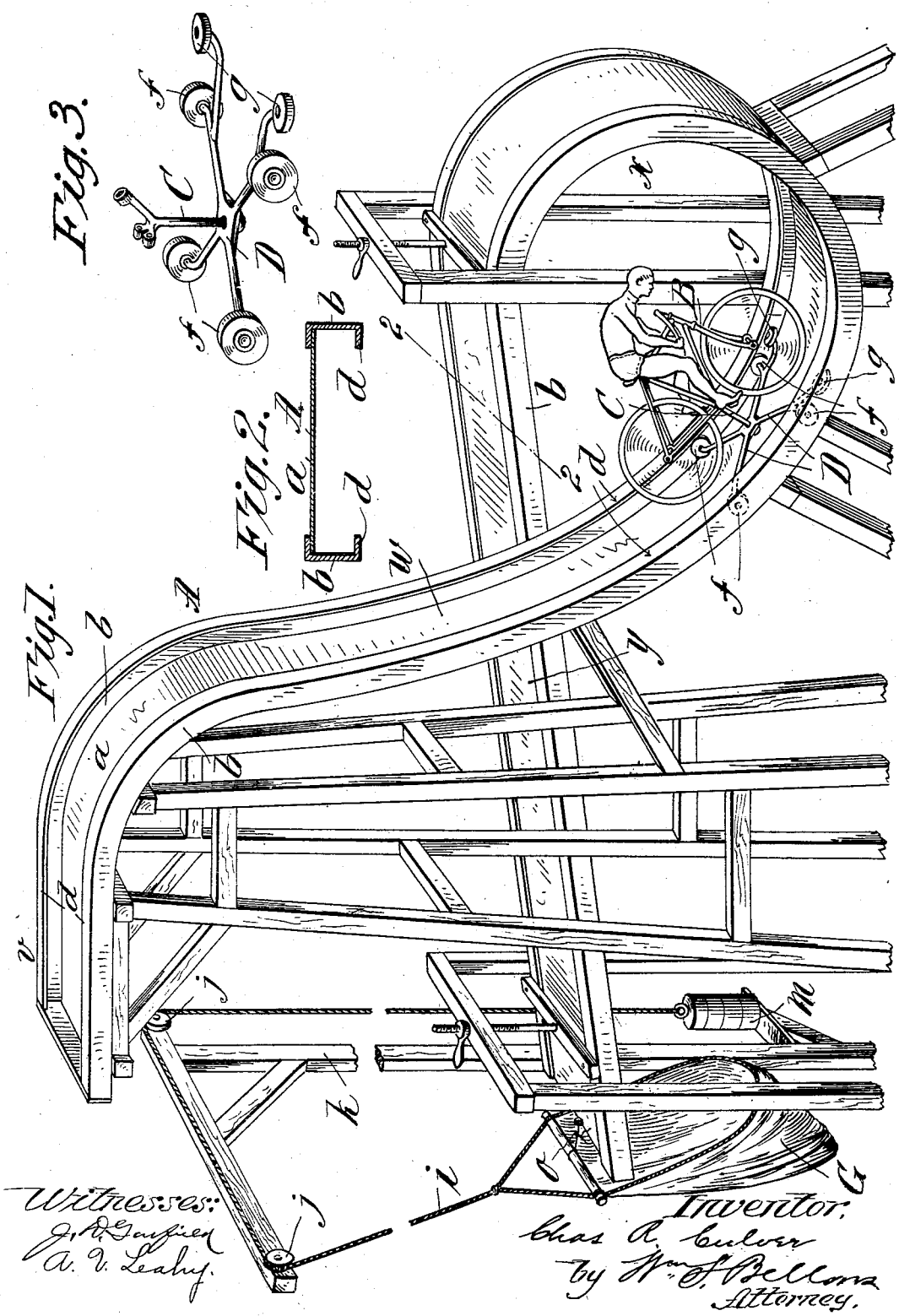

No. 739,155.

Patented September 15, 1903.

UNITED STATES PATENT OFFICE.

CHARLES R. CULVER, OF SPRINGFIELD, MASSACHUSETTS, ASSIGNOR TO HAROLD A. LEY, OF SPRINGFIELD, MASSACHUSETTS.

TRACKWAY FOR BICYCLE-RIDERS OR OTHER PERFORMERS.

SPECIFICATION forming part of Letters Patent No. 739,155, dated September 15, 1903.

Application filed January 3, 1903. Serial No. 137,639. (No model.)

*To all whom it may concern:*

Be it known that I, CHARLES R. CULVER, a citizen of the United States of America, and a resident of Springfield, in the county of Hampden and State of Massachusetts, have invented certain new and useful Improvements in Trackways for Bicycle-Riders or other Performers, of which the following is a full, clear, and exact description.

This invention relates to an amusement apparatus in which a "loop-the-loop" act may be performed by the rider of a vehicle, preferably such as a bicycle; and the same consists in the constructions and arrangements or combinations of parts, as is hereinafter described in connection with the accompanying drawings, in which—

Figure 1 is a perspective view of a looped trackway, showing a bicycle in running engagement therewith and a rider thereon. Fig. 2 is a cross-section of a portion of the trackway as taken at the line 2 2, Fig. 1. Fig. 3 is a perspective view of a roller-supporting frame, which is suspended from rigid connection with the frame of the bicycle.

Similar characters of reference indicate corresponding parts in all of the views.

In the drawings, A represents the trackway, which in its longitudinal extent may have detours, loops, inclines, or other formations to give variety and attractiveness to the act to be performed thereon. The track comprises a tread-section $a$, opposite vertical side sections $b\ b$, and inturned narrow flanges $d\ d$, parallel with and separated from the tread-section.

The bicycle B to run on the trackway has rigidly secured to and depending below the middle of the frame thereof the bar or leg C, at the bottom of which is formed or rigidly affixed the frame D, having journaled thereon one or more pairs of rollers $f\ f$, rotatable in vertical parallel planes and adapted to have rolling engagements on and between the tread-section $a$ and the inner surface of the flanges $d\ d$ of the trackway, so that even while the bicycle may be running around a looped portion or along an inverted portion of the trackway the bicycle may by the main wheels thereof have tractional bearing on the track-tread, as retained thereto by the engaging parts mentioned. The said frame D also has journaled thereon for rotation in horizontal planes the rollers $g\ g$, which engage by their peripheries on the inner surfaces of the track sides $b\ b$.

As shown, the trackway in its course from end to end comprises the elevated horizontal portion $v$ for the start, the downwardly-inclined portion $w$, in which to acquire momentum, the loop $x$, at which the bicycle may be brought to an overturned position with the rider thereon, and the inverted extension $y$, along which the performer may ride head downward. The extension $y$ is shown as terminating in proximity to suspension means for a receptacle G, such as a bag or net, into which the rider in running off from the open end of the track extension may plunge, and said receptacle is shown as hung at the end portion of the rope $i$, which is guided over the sheaves $j\ j$ of the elevated support $k$ and has at its other end the counterweight $m$.

$o$ represents an easily-breakable tie for holding the receptacle G closely to the open end of the track-terminal, it being understood that the force of the rider and the vehicle in coming into the bag will break the tie and leave the bag free to be swung away from the proximity to the track, and the rider in the bag will slowly settle toward the ground or floor against the resistance of the counterweight, which will yield thereto comparatively quickly or slowly, corresponding to the number of weight-sections used.

Of course it is apparent that this apparatus is susceptible of considerable range of variation, especially in respect of the extent and courses of the trackway, without departing from this invention.

Having thus described my invention, what I claim, and desire to secure by Letters Patent, is—

1. In an apparatus of the character described, the combination with a trackway, cross-sectionally of trough form having inturned flanges projecting from the sides separated from the base or tread portion, of a bicycle to run on said track having a bar secured to and depending below the frame thereof, and having affixed to the bottom of the bar, a horizontal frame provided with opposite side trucks rotatable in vertical planes and engaging with rolling bearings between the flange and tread portions at the opposite sides of the trackway, and said suspended frame also having rollers rotatable in a horizontal plane and having rolling bearings on the inner surfaces of the track side sections.

2. In an apparatus of the character described, the combination with a trackway cross-sectionally of trough form having inturned flanges projecting from the sides, separated from the base or tread portion, and in its lengthwise course comprising an incline and a loop whereby a portion of the length of the track is inverted of a bicycle to run on said track, having a bar secured to and depending below the frame thereof and having affixed to the bottom of the bar, a horizontal support provided with opposite side trucks rotatable in vertical planes and engaging with rolling bearings between the flange and tread portions at the opposite sides of the trackway.

3. In an apparatus of the character described, a trackway having the cross-sectional trough form with inturned flanges as described, and as to its length comprising an elevated portion, and a downwardly-inclined portion continued in a loop further extended in an inverted portion, combined with a bicycle to run on the trackway having carried rigidly below the frame a support having rollers engaging within the opposite flanged portions of the trackway.

4. In an apparatus of the character described, a trackway having the cross-sectional trough form with inturned flanges, as described, and as to its length comprising an elevated portion, and a downwardly-inclined portion continued in a loop further extended in an inverted portion combined with a bicycle to run on the trackway having carried rigidly below the frame a support having rollers engaging within the opposite flange portions of the trackway, and a receptacle into proximity to which the trackway terminates.

5. In an apparatus of the character described, in combination, a trackway cross-sectionally of trough form having the inturned opposite flanges, and comprising in its length a downwardly-inclined portion, a loop continuation and an inverted extension, a receptacle adjacent the open end of the trackway, a support from which the same is suspended, an easily-severed tie device, holding said receptacle near the end of the track and a bicycle to run on the track having a rigid suspension-support provided with rollers engaging within the opposite flanged sides of the track.

6. In an apparatus of the character described, in combination, a trackway, cross-sectionally of trough form having the inturned opposite flanges and comprising in its length a downwardly-inclined portion, a loop continuation and an inverted extension, a bag adjacent the open end of the trackway, a cord from one end of which the same is suspended, intermediate guiding-sheaves for the cord and a counterweight therefor, and a bicycle to run on the track having a rigid suspension-support provided with rollers engaging within the opposite flanged sides of the track.

Signed by me at Springfield, Massachusetts, in presence of two subscribing witnesses.

CHARLES R. CULVER.

Witnesses:
WM. S. BELLOWS,
A. V. LEAHY.